(12) United States Patent
Alpert et al.

(10) Patent No.: US 8,386,985 B2
(45) Date of Patent: Feb. 26, 2013

(54) TIMING DRIVEN ROUTING IN INTEGRATED CIRCUIT DESIGN

(75) Inventors: Charles Jay Alpert, Austin, TX (US); Zhuo Li, Austin, TX (US); Stephen Thomas Quay, Austin, TX (US); Ying Zhou, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 13/102,776

(22) Filed: May 6, 2011

(65) Prior Publication Data
US 2012/0284683 A1  Nov. 8, 2012

(51) Int. Cl.
*G06F 17/50* (2006.01)
(52) U.S. Cl. .......................... 716/129; 716/126; 716/130
(58) Field of Classification Search .................. 716/126, 716/129, 130
See application file for complete search history.

(56) References Cited

U.S. PATENT DOCUMENTS

| | | | |
|---|---|---|---|
| 7,415,687 B2 | 8/2008 | Lahner et al. | |
| 7,581,201 B2 | 8/2009 | Kazda et al. | |
| 2002/0188919 A1 | 12/2002 | Rainbaut et al. | |
| 2005/0120319 A1 | 6/2005 | Van Ginneken | |
| 2006/0242614 A1 | 10/2006 | Wadland et al. | |
| 2007/0089074 A1 | 4/2007 | Ramachandran et al. | |
| 2008/0163149 A1 | 7/2008 | Curtin et al. | |
| 2008/0216040 A1* | 9/2008 | Furnish et al. | 716/10 |
| 2009/0254874 A1* | 10/2009 | Bose | 716/6 |
| 2009/0319977 A1* | 12/2009 | Saxena et al. | 716/13 |
| 2011/0055791 A1 | 3/2011 | Gao | |
| 2011/0061038 A1* | 3/2011 | Qiao et al. | 716/126 |
| 2012/0011482 A1* | 1/2012 | Alpert et al. | 716/112 |

OTHER PUBLICATIONS

Huang et al.; "An Efficient Timing-Driven Global Routing Algorithm"; 2003; Department of Computer Science and Engineering UC San Diego; pp. 1-5.*
Tseng et al.; "Timing and Crosstalk Driven Area Routing"; 2001; IEEE; pp. 528-544.*
Coudert O; Timing and Design Closure in Physical Design Flows, Proceedings of the International Symposium on Quality Electronic Design (ISQE⁀ 02), 2002.
Xu et al; Timing optimization for deep sub-micron hierarchical design, 2010 10th IEEE International Conference on Solid-State and Integrated Circuit Technology, Proceedings, CFP10829-Art (599-601), Dec. 2010.

* cited by examiner

*Primary Examiner* — Suresh Memula
(74) *Attorney, Agent, or Firm* — Garg Law Firm, PLLC; Rakesh Garg; Libby Z. Toub

(57) ABSTRACT

A method, system, and computer program product for timing driven routing in a design of an integrated circuit (IC) are provided in the illustrative embodiments. A router application executing in a data processing system performs a pre-global routing optimization of the design. A plurality of wirelength target constraints are set on a plurality of subsets of a set of nets in the design. Global routing is performed on the design. The design is adjusted using wires placed in the design during the global routing. A priority is assigned to each net in the set of nets. Detailed routing is performed on the design.

20 Claims, 6 Drawing Sheets

TIMING DRIVEN ROUTING IN INTEGRATED CIRCUIT DESIGN

BACKGROUND

1. Technical Field

The present invention relates generally to a method, system, and computer program product for designing an integrated circuit. More particularly, the present invention relates to a method, system, and computer program product for improving the design of the integrated circuit (IC) by using timing driven routing.

2. Description of the Related Art

Modern day electronics include components that use integrated circuits. Integrated circuits are electronic circuits formed using Silicon as a substrate and by adding impurities to form solid-state electronic devices, such as transistors, diodes, and resistors. Commonly known as a "chip", an integrated circuit is generally encased in hard plastic. The components in modern day electronics generally appear to be rectangular black plastic pellets with connector pins protruding from the plastic encasement.

Circuit designers use a variety of software tools to design electronic circuits that accomplish an intended task. For example, a digital circuit may be designed to accept digital inputs, perform some computation, and produce a digital output. An analog circuit may be designed to accept analog signals, manipulate the analog signals, such as my amplifying, filtering, or mixing the signals, and produce an analog or digital output. Generally, any type of circuit can be designed as an IC.

Logical synthesis, physical synthesis, and generation of a routed and timing closed design are some of the functions of an IC design software tool. Logical synthesis is the process of designing the logical operation that is to be achieved by a circuit. Physical synthesis is the mapping, translating, or integration of that logical synthesis to the physical design components, such as logic gate and buffer circuits. Routing and timing closed design is the design produced by adjusting the wire routings in and component placements in a design so that the design meets certain design criteria such as delay or slew of signals, or wirelength restrictions.

The software tools used for designing ICs produce, manipulate, or otherwise work with the circuit layout at very small scales. Some of the components that such a tool may manipulate may only measure tens of nanometer across when formed in Silicon. The designs produced and manipulated using these software tools are complex, often including millions of such components interconnected to form an intended electronic circuitry. An interconnected group of components is called a net.

The software tools manipulate these components at the components level, or blocks of components level. A block of components is also known as a global cell, or g-cell. A g-cell in an IC design is a portion of the IC design. One way of identifying g-cells in an IC design is to overlay a grid of imaginary vertical and horizontal lines on the design, and deeming each portion of the IC design bound by horizontal and vertical lines as a g-cell. The horizontal or vertical lines bounding a g-cell are called cut-lines.

Imposing such a grid on an IC design abstracts the global routing problem away from the actual wire implementation and gives a more mathematical representation of the task. A net may span one or more g-cells and may cross several cut lines.

An IC design software tool can, among other functions, manipulate cells, or interconnect components of one cell with components of other cells, such as to form nets. These cells are different from g-cells in that these cells are the actual logic components, such as the semiconductor gates. The interconnects between components are called wires. A wire is a connection between parts of electronic components, and is formed using a metallic material that conducts electricity.

Placement problem is the problem of placing the cells of a chip such that the design meets all the design parameters of the chip. Routing is the process of connecting the pins after placement. In other words, placement results in a rendering of the components of various cells as being located in certain positions in the design, whereas routing results in a rendering of how the metal layers would be populated with that placement.

A wire can be designed to take any one of the several available paths in a design. Placement of a wire on a certain path, or track, is a part of routing.

A layer is typically designated to accommodate wires of a certain width (wire code). Generally, the wider the wire width of a layer or higher the height of a layer, the faster the signal propagation speed for the net routed on that layer. Faster layers, to with, layers with larger wire widths and wire height, can accommodate fewer components or nets as compared to slower layers with narrower wire widths.

A router is a component of an IC design tool that performs the routing function. Once the placement component—known as a placer—has performed the placement function, the router attempts to connect the wires without causing congestion. For example, if a design parameter calls for no more than five wires in a given area, the router attempts to honor that restriction in configuring the wiring. Such limitations on the wiring are a type of design constraints and are called congestion constraints. Other types of design constraints may include, for example, blocked areas—cell areas where wires may not be routed.

A global router divides the routing region into g-cells and attempts to route nets through the g-cells such that no g-cell overflows its capacity. Global routing is the process of connecting a g-cell to other g-cells.

After global routing, wires must be assigned to actual tracks within each tile, followed by detail routing, which must connect each global route to the actual pin shape on the cell. Another type of router—known as the detailed router—performs the detailed routing. The global and detailed routing produced during the design process is collectively referred to as "routing" and is usually further modified during optimization of the design.

SUMMARY

The illustrative embodiments provide a method, system, and computer program product for timing driven routing in integrated circuit design. An embodiment performs, using a router application executing in a data processing system, a pre-global routing optimization of the design. The embodiment sets a plurality of wirelength target constraints on a plurality of subsets of a set of nets in the design. The embodiment performs global routing on the design. The embodiment adjusts the design using wires placed in the design during the global routing. The embodiment assigns a priority to each net in the set of nets. The embodiment performs detailed routing on the design.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
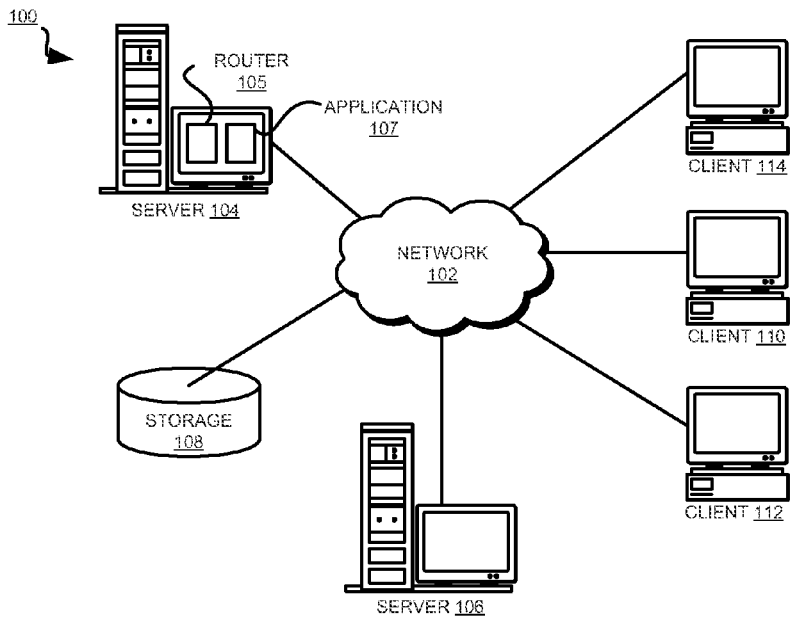
FIG. 1 depicts a pictorial representation of a network of data processing systems in which illustrative embodiments may be implemented.

One of the functions of the placement and optimization step in IC design is to minimize the wirelengths of the nets in the design. The longer the wirelength of a net, the longer the delay in the net. Many wirelength optimization algorithms are available. Steiner tree algorithm is a well known algorithm used by many placement tools for forming the nets in an IC design.

Presently, the placement step in an IC design process produces a design that includes nets with their timing optimized within desirable timing thresholds. The invention recognizes that routing such an optimized design in the IC design process often deteriorates, severely in some cases, the timing characteristics of the post placement optimized nets.

The invention recognizes that presently used routers are not aware of the criticality of the nets present in the optimized design they are routing. A net is critical if a change in a characteristic of the net, such as delay in the net, violates a parameter or specification of the design.

Therefore, when a router routes a previously optimized design, the timing and the overall figure of merit of the design are often deteriorated. In one example routing, the Steiner optimized timing metric of −0.17 nano second was observed to deteriorate to −9.73 nano second after routing. For that example routing, the overall figure of merit of the design deteriorated from −5.4 after Steiner optimization to −16422 after routing.

The illustrative embodiments used to describe the invention generally address and solve the above-described problems and other problems related to routing an IC design. The illustrative embodiments provide a method, system, and computer program product for improved IC design using timing driven routing.

While some embodiments are described with respect to each net in a design, an implementation may use an embodiment with respect to less than all the nets in the design without departing the scope of the invention. For example, an implementation may some but not all the nets in the manner of an embodiment without departing the scope of the invention.

The illustrative embodiments are described with respect to certain ICs or circuits only as examples. Such descriptions are not intended to be limiting on the invention. For example, an illustrative embodiment described with respect to a microprocessor design can be implemented with respect to any other IC design whose routing can be improved by using an embodiment.

The illustrative embodiments are described with respect to certain data, data structures, file-systems, file names, directories, and paths only as examples. Such descriptions are not intended to be limiting on the invention. For example, an illustrative embodiment described with respect to a local application name and path can be implemented as an application on a remote path within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
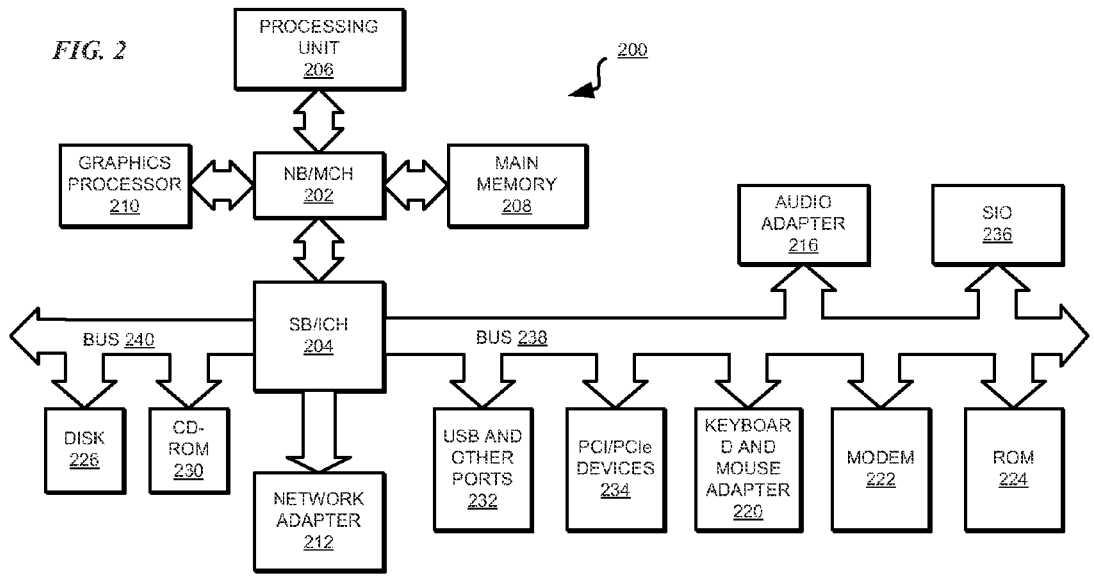
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Any data processing system, such as server 104, may include router 105 that may be improved using an embodiment. Application 107 may be any combination of hardware and software usable for implementing an embodiment of the invention such that the embodiment is usable with router 105 for creating an improved routing.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
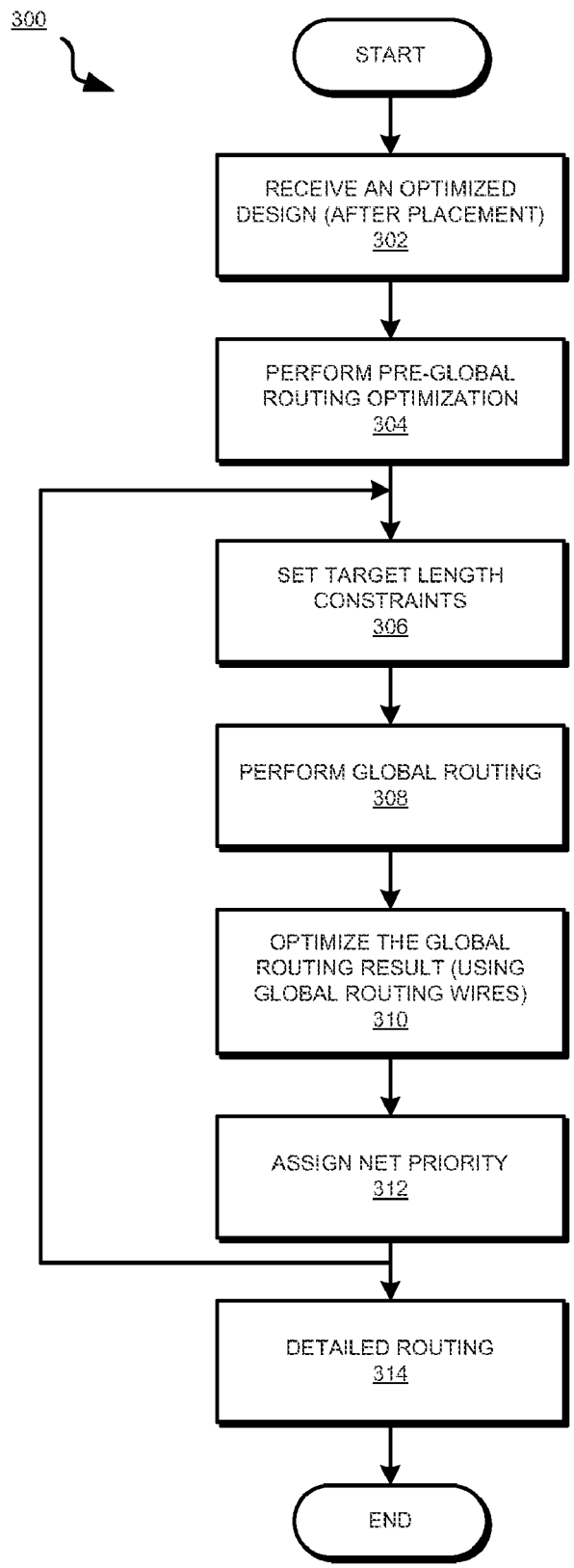
FIG. 3 depicts a flowchart of an overall timing driven routing process in accordance with an illustrative embodiment.

With reference to FIG. 3, this figure depicts a flowchart of an overall timing driven routing process in accordance with an illustrative embodiment. Process 300 may be implemented as an improvement in router 105 in FIG. 1, or as application 107 usable to improve the operation of router 105 in FIG. 1.

Presently, following the timing optimization after placement, the design process performs global routing followed by the detailed routing, which deteriorate the timing in the routed design as described earlier. Process 300 begins by receiving an optimized design, such as a timing optimized design after the placement step in the design process (step 302). Process 300 performs a pre-global routing optimization, such as process 400 in FIG. 4 (step 304).

Figure 5:
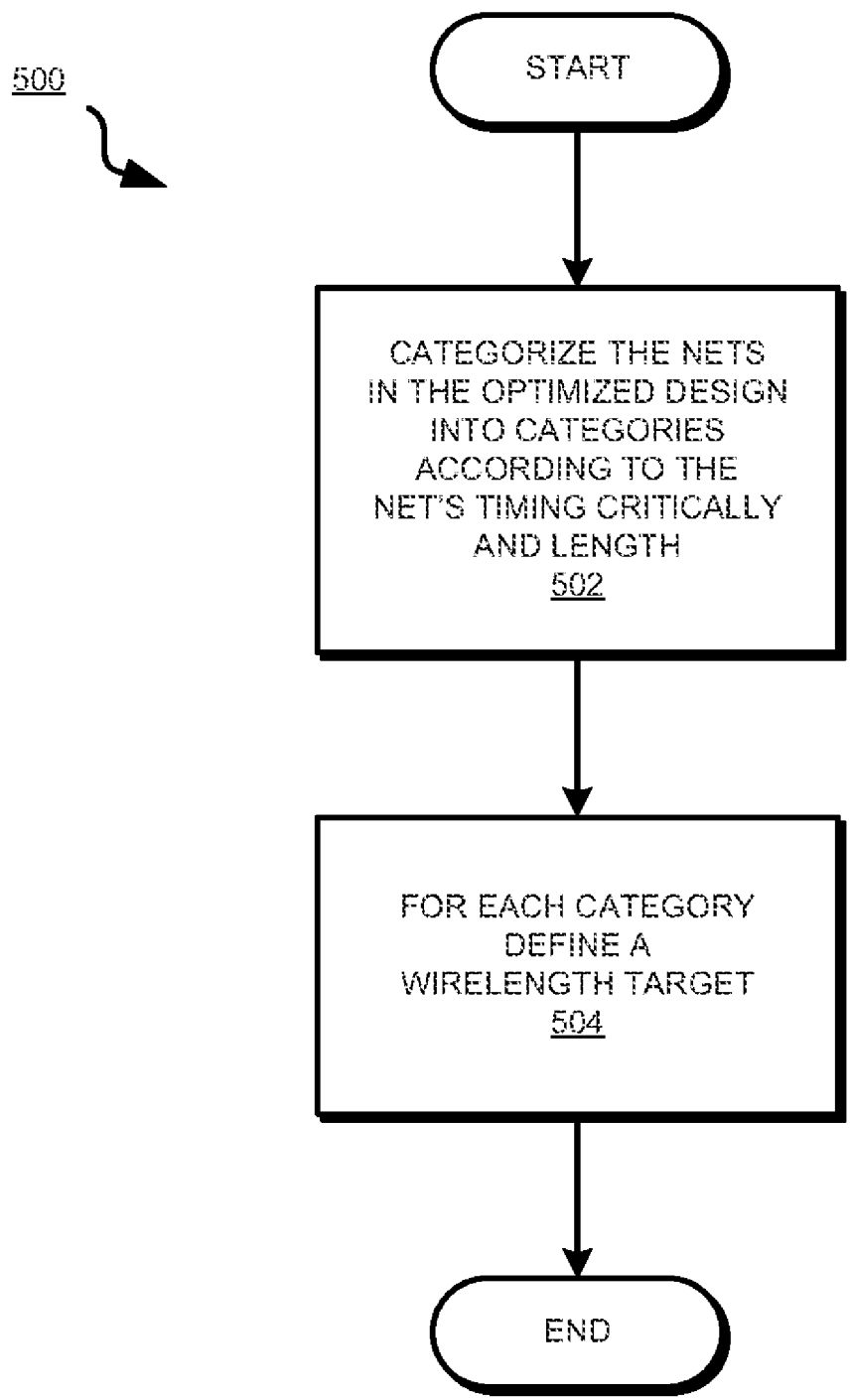
FIG. 5 depicts a flowchart of an example process for setting wirelength targets in accordance with an illustrative embodiment.

Process 300 sets target wirelength constraints for a set of nets, such as according to process 500 in FIG. 5 (step 306). A set of nets is one or more nets. Process 300 then performs the global routing (step 308).

Process 300 optimizes the global routing result, to wit, the global routed design including the wires routed during the global routing process, (step 310). For example, process 300 may perform step 310 using process 600 in FIG. 6.

Figure 7:
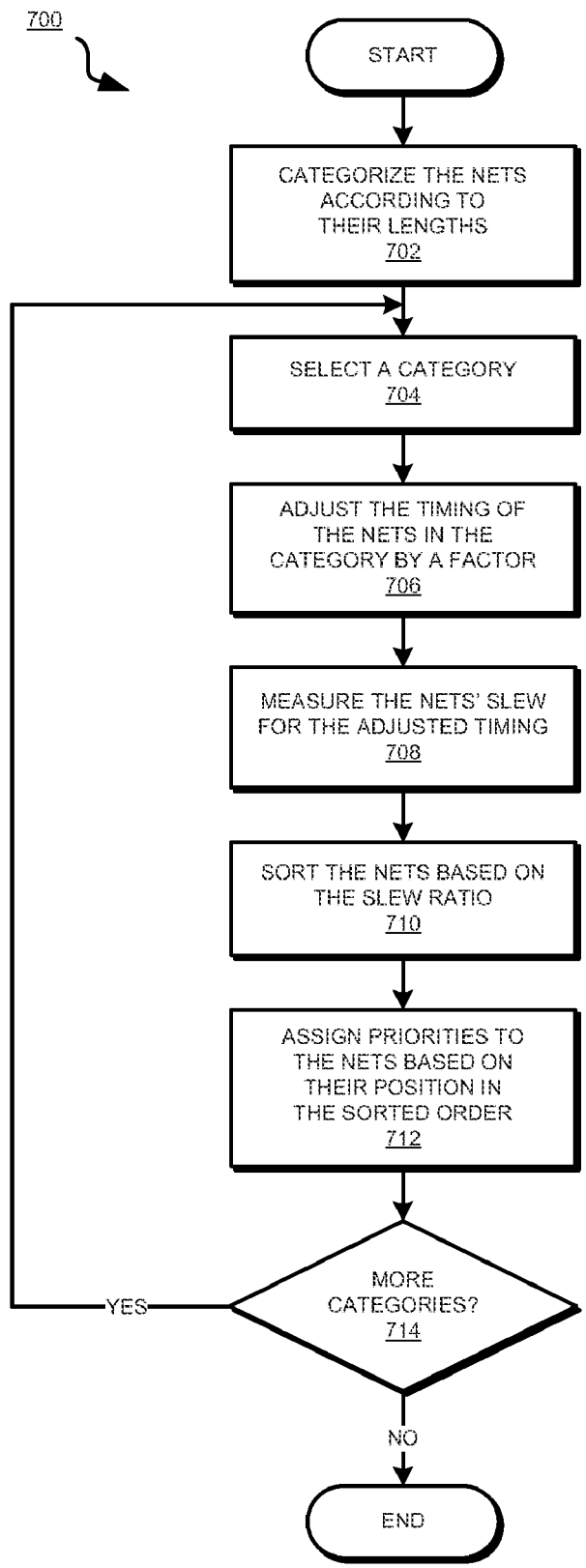
FIG. 7 depicts a flowchart of a process for assigning priorities to nets in a design according to an illustrative embodiment.

Process 300 also sets or assigns priorities to sets of nets, such as according to process 700 in FIG. 7 (step 312). Process 300 performs detailed routing of the resulting design (step 314). Process 300 ends thereafter.

Several steps of process 300 are described in detail in subsequent figures as indicated. Furthermore, process 300 may repeat one or more steps in an iterative manner to incrementally improve the global routed design before performing the detailed routing. For example, as shown, process 300 may perform more than one pass through steps 306-312 before reaching the detailed design step.

Additionally, an iteration may undo a previous iteration if the incremental modifications of the previous iteration fail to meet a design specification. Process 300 may also perform certain steps in an order other than as shown in FIG. 3. For example, in one embodiment, process 300 may assign net priorities before the global routing of step 308, and set the target wirelengths afterwards. In another embodiment, process 300 may set the target wirelengths and assign net priorities before the global routing of step 308.

Figure 4:
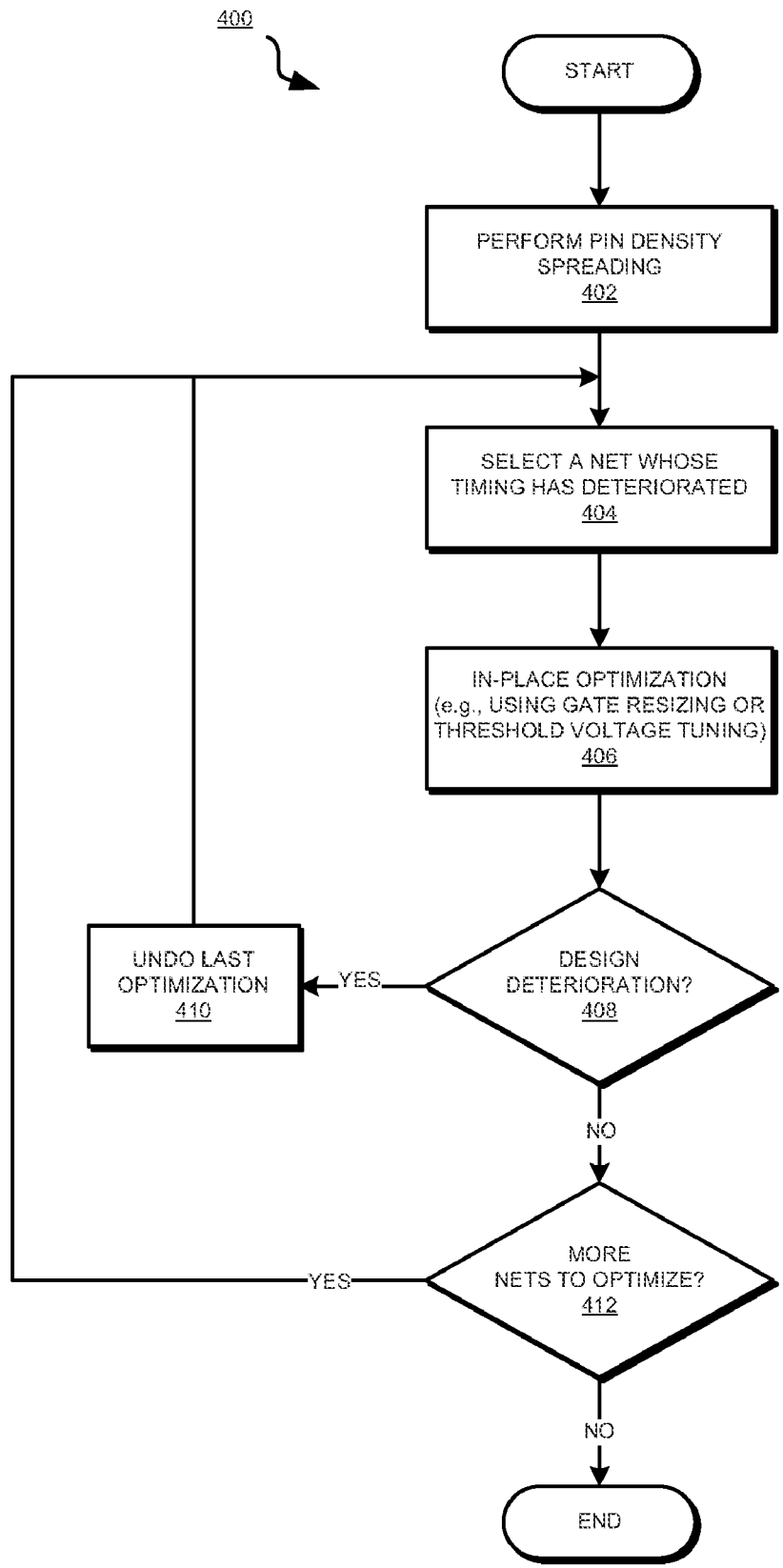
FIG. 4 depicts a flowchart of a pre-global routing optimization process in accordance with an illustrative embodiment.

With reference to FIG. 4, this figure depicts a flowchart of a pre-global routing optimization process in accordance with an illustrative embodiment. Process 400 may be implemented as step 304 in process 300 in FIG. 3.

Process 400 begins by performing pin density spreading to improving the routability of the optimized design from placement (step 402). Process 400 selects a net whose timing has deteriorated beyond a threshold as a result of the pin density spreading (step 404).

For the selected net, process 400 performs in-place optimization of the design after the pin density spreading so that the timing optimization of the placement step is minimally disturbed (step 406). In other words, process 400 performs the optimization within a cell such that the cell does not have to be moved to a new location.

For example, process 400 may not insert buffers for the optimization of step 406 because buffer additional may cause a cell to move to a different location, thereby disturbing the wirelengths of nets that cross that cell's boundaries. Process 400 may perform the optimization of step 406 by tuning the threshold voltage of components or resizing the gates in-place, or by using other in-place timing adjustments.

Process 400 evaluates whether the design has deteriorated as a result of the in-place optimization (step 408). Process 400 may perform global routing (not shown in FIG. 4, but see a comparable step 606 in FIG. 6) using the optimized design resulting from step 406 to make the determination of step 408. In terms of time and computing resources, global routing is relatively inexpensive as compared to detailed routing. Therefore, global routing can be run even after incremental changes to determine the suitability of the incremental change, and whether to reject that change.

For example, the in-place optimization of step 406 may cause another design criterion, such as the delay of another net or a slew rate of a signal at a location in the design, to exceed a threshold condition. If the design has been deteriorated, such as when a design criterion is violated ("Yes" path of step 408), process 400 backs out or removes the modifications performed during the previous execution of the optimization step 406 (step 410). Process 400 returns to step 404 to select the same net and try a different in-place optimization or to select a different net and perform in-place optimization on the different net.

The in-place optimization of step 406 may improve the timing of the selected net and may maintain other design criteria within specified thresholds. Thus, if the design shows an improvement as a result of the in-place optimization, or at least no deterioration beyond a threshold ("No" path of step 408), process 400 determines whether more nets remain to be optimized using in-place timing optimization in a similar manner (step 412). If more nets are to be optimized for timing corrections after the pin density spreading ("Yes" path of step 412), process 400 returns to step 404 and iterates through steps 404-412 as described above with another net. If no more nets are to be optimized ("No" path of step 412), process 400 ends thereafter.

With reference to FIG. 5, this figure depicts a flowchart of an example process for setting wirelength targets in accordance with an illustrative embodiment. Process 500 may be implemented as step 306 in process 300 in FIG. 3.

A wirelength target for a net is a threshold wirelength for the net. In other words, the wirelength target limits the maximum length of wire the router is allowed to use when routing the net.

Process 500 begins by categorizing the nets in the design into categories according to each net's timing criticality and length (step 502).

In operation, step 502 includes first dividing the nets in the design into two broad categories—critical nets and non-critical nets using a slack threshold. Slack is a timing characteristic of a net representing the difference between a signal's actual arrival time at a point and the desired arrival time of the signal at that point.

Step 502 also categorizes the nets in step 502 according to their wirelengths. Any number of length thresholds may be defined to categorize the nets according to their wirelengths. For example, a single length threshold will enable classifying the nets into two categories—those that are shorter than the threshold (short), and those that are longer than the threshold (long). Similarly, defining two thresholds for lengths allows for three categories of nets—shorter than the first threshold (short), between the two thresholds (medium), and longer than the second threshold (long). In a similar manner, an implementation using nine thresholds can categorize the nets into ten categories according to their wirelengths. For the clarity of the description and not as a limitation on the invention, the operations of process 500 are explained using the short, medium, and long wirelength categories.

Process 500 sets wirelength target constraints for categories of nets formed in step 502 (step 504). Process 500 ends thereafter.

For example, short nets are typically driven by smaller power sources and normally tend to be more timing critical than the longer nets. Accordingly, step 504 may define the target constraints differently for the different categories of nets.

Using the three-category example, in one embodiment, the wirelength target constraint for each category of nets may be defined as not to exceed the Steiner length of the net plus a specified fixed length. For example, the short nets may not exceed the Steiner length+150 micrometers, the medium nets may not exceed the Steiner length+300 micrometers, and the long nets may not exceed the Steiner length+450 micrometers.

In another embodiment, the wirelength target constraint for each category of nets may be defined as not to exceed a multiple of the net's Steiner length. For example, the short nets may not exceed one hundred and twenty percent of the net's Steiner length, the medium nets may not exceed two hundred percent of the net's Steiner length, and the long nets may not exceed three hundred percent of the net's Steiner length.

In another embodiment, the wirelength target constraints for some categories of nets may be defined differently than others. For example, a short net may not to exceed the Steiner length of the net plus a specified fixed length. The medium nets may not exceed two hundred percent of the net's Steiner length, and the long nets may not exceed three hundred percent of the net's Steiner length.

In another embodiment, the wirelength target constraints for some categories of nets may be defined differently than others based on multiple conditions or considerations. For example, a short net may not to exceed the Steiner length of the net plus a specified fixed length. Those nets in the medium category whose slack is greater than a slack threshold may not exceed two hundred percent of the net's Steiner length. Those nets in the long category whose slack is greater than the slack threshold may not exceed three hundred percent of the net's Steiner length. Furthermore, those nets in the medium or long categories whose slack is less than the slack threshold may not exceed one hundred and thirty percent of the net's Steiner length if the net is in top 0.05 percent according to the timing criticality. Those nets in the medium or long categories whose slack is less than the slack threshold may not exceed one hundred and fifty percent of the net's Steiner length if the net is next 8 percent of the nets according to the timing criticality. Those nets in the medium or long categories whose slack is less than the slack threshold may not exceed one hundred and eighty percent of the net's Steiner length if the net is next 15 percent of the nets according to the timing criticality.

The above embodiments describe various example ways of categorizing the nets in a design and for defining wirelength targets for those categories. These examples are described only for the clarity of the disclosure and not as a limitation on the invention. Any number targets may be defined in a similar manner to suit a particular implementation. Those of ordinary skill in the art will be able to conceive many other ways of defining the wirelength thresholds from this disclosure, and the same are contemplated within the scope of the invention.

Figure 6:
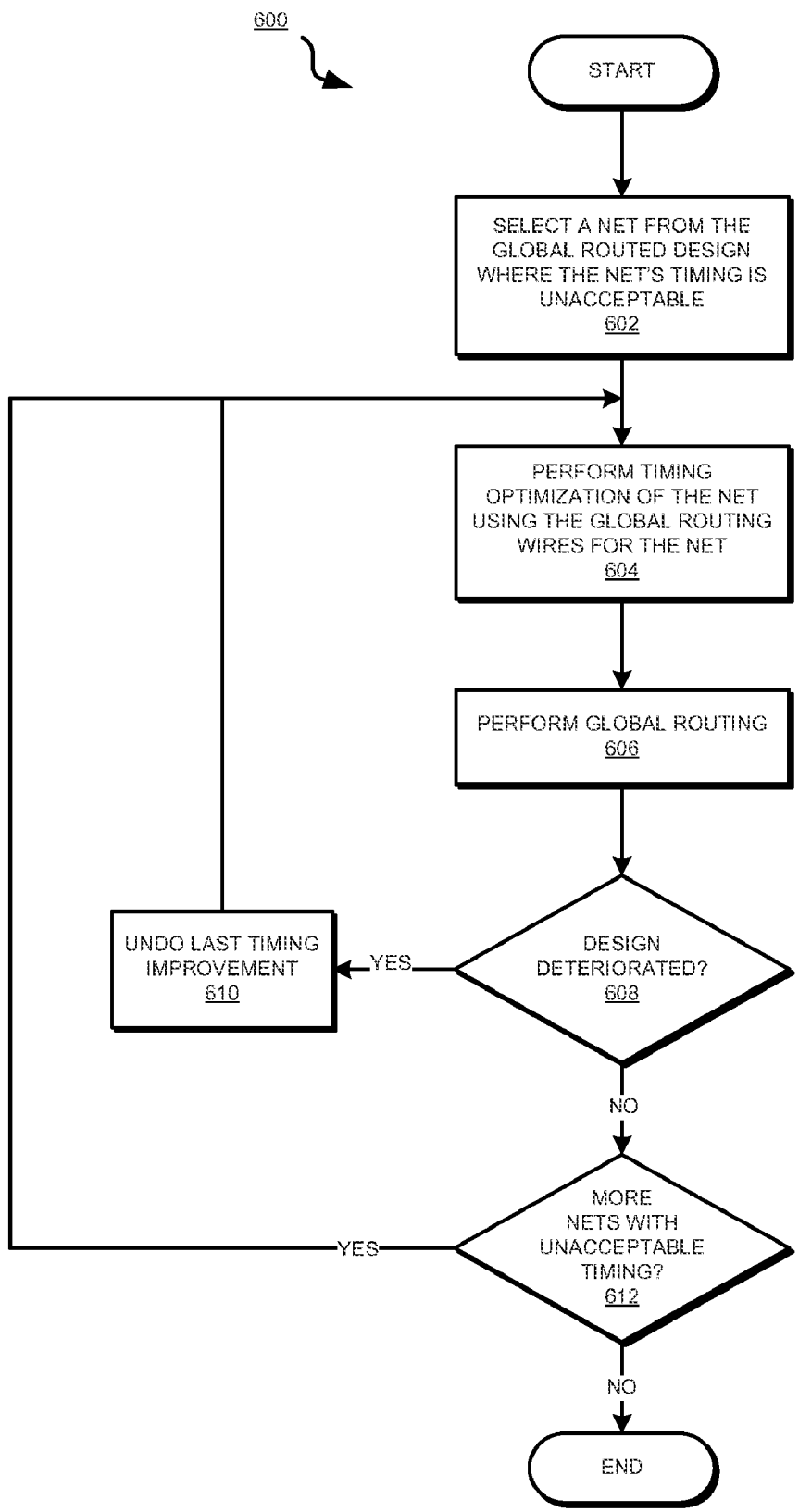
FIG. 6 depicts a flowchart of an example process for performing post global routing optimization using the global routing wires resulting from global routing in accordance with an illustrative embodiment.

With reference to FIG. 6, this figure depicts a flowchart of an example process for performing post global routing optimization using the global routing wires resulting from global routing in accordance with an illustrative embodiment. Process 600 may be implemented as step 310 in FIG. 3.

Process 600 starts by selecting a net from the global routed design where the net's timing is unacceptable, for example, where the net's delay exceeds a threshold (step 602). Process 600 performs any suitable timing optimization of the net using the wires placed by the global router during the global routing (step 604). The timing optimization of the net in step 604 may use any suitable optimization technique or a combination thereof, including but not limited to a combination of threshold voltage tuning, repowering a gate, or buffering the net.

Process 600 may (optionally) perform global routing again after the optimization of step 604 (step 606). As noted above, global routing is relatively inexpensive as compared to detailed routing. Therefore process 600 may chose to perform global routing at step 606 after the incremental optimization of step 604 to determine the suitability of the changes made to the design in step 604.

Process 600 determines, such as by evaluating the design after performing global routing of step 606, whether the optimization of step 604 has resulted in an deterioration of the design (step 608). If the design has deteriorated ("Yes" path of step 608), process 600 may chose to undo the changes made by the previous iteration through step 604 (step 610). Step 608 may determine whether the design has deteriorated as compared to the previous design by, for example, determining whether a design parameter that was not violated in the previous design is violated after optimization.

If the design has improved, or at least not deteriorated beyond a threshold ("No" path of step 608), process 600 determines whether more nets exist in the design with unacceptable timing characteristics (step 612). If more nets with unacceptable timing characteristics exist ("Yes" path of step 612), process 600 returns to step 604. If no more nets with unacceptable timing characteristics exist ("No" path of step 612), process 600 ends thereafter.

An example way of determining whether a net has an unacceptable timing characteristic is to compare the net's timing violation to a threshold for timing violation and consider the net as acceptable if the timing of the net, even though in violation, does not exceed the threshold for timing violation, because some timing violations can be corrected even after the global routing phase of the design has been completed. While process 600 has been described with respect to timing violations and timing characteristics, process 600 is adaptable to use other characteristics of a net, such as slew or capacitance characteristics, in a similar manner without departing the scope of the invention.

With reference to FIG. 7, this figure depicts a flowchart of a process for assigning priorities to nets in a design according to an illustrative embodiment. Process 700 may be implemented as step 312 in process 300 in FIG. 3.

Process 700 begins by categorizing a set of nets in a design according to their wirelengths (step 702). Process 700 selects a category (step 704). Process 700 adjusts the timing of the nets in that category by a factor (step 706). For example, process 700 may select a category of short nets in step 704. In step 706, process 700 may, for example, by simulation, increase the resistance, capacitance, inductance, or a combination thereof, of the short nets ten folds.

As another example, process 700 may select a category of medium or long nets in step 704. In step 706, process 700 may, for example, by simulation, increase the resistance, capacitance, inductance, or a combination thereof, of the medium or long nets by one hundred and forty percent. By adjusting the timing in this manner, process 700 can expose the weak gates in the nets in the selected category for further modifications.

Process 700 measures the slew rate or ratio of the nets in the selected category after the timing adjustment of step 706 (step 708). Process 700 sorts the nets in the selected category by their measured slew rates (step 710).

Process 700 assigns priorities to the nets in the selected category according to the nets' positions in the sorted order of step 710 (step 712). For example, in a selected category of short nets, process 700 may assign the nets in the top 0.05 percent of the sorted list the highest priority, e.g., priority 9. Process 700 may assign the nets in the next top 0.05 percent of the sorted list the next highest priority, e.g., priority 8. Process 700 may assign the nets in the next top 0.05 percent of the sorted list the next highest priority, e.g., priority 7. Process 700 may assign priorities 9, 8, 7, 6, 5, and 4 in a similar example manner for the top 3 percent of the sorted list for the short nets. Process 700 may similarly assign priorities 9, 8, 7, 6, 5, and 4 in a similar example manner for the top 3 percent of the sorted list for the medium and long nets. The remaining nets in each category may be assigned other priorities based on other percentages or other criteria.

This example way of assigning priorities by percentages is only described for the clarity of the disclosure and not as a limitation on the invention. Many other ways of assigning priorities using the sorted order within categories of nets will be apparent from this disclosure to those of ordinary skill in the art and the same are contemplated within the scope of the invention.

Process 700 determines whether more categories of nets remain to be sorted and prioritized in this manner (step 714). If more categories of nets remain to be sorted and prioritized in this manner ("Yes" path of step 714), process 700 returns to step 704 to select another category. If no more categories remain ("No" path of step 714), process 700 ends thereafter.

The priorities assigned to the nets in a design are usable for further routing in accordance with an embodiment. For example, the prioritization can be used for performing another iteration of global routing, should an implementation so decide. The prioritization can also be used for detailed routing. A router, whether during global routing or detailed routing, routes a net according to the associated priority. For example, a router may route all priority 9 nets before routing priority 8 nets, and so on.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for timing driven routing in integrated circuit design. Using an embodiment of the invention in an example implementation, the Steiner optimized timing metric of −0.17 was observed to improve to −0.16 as compared to −9.73 without using an embodiment. For that example routing, the overall figure of merit of the design deteriorated from −5.4 after Steiner optimization to—only −28 as compared to −16422 observed without using an embodiment.

An embodiment may improve design closure repeatability and stability. An embodiment may also improve overall timing characteristics of the design. Using an embodiment, the time consumed in the detailed routing phase of a design process can be significantly reduced. In one example implementation using an embodiment caused the total time for routing to increase from fifteen hours and seventeen minutes to sixteen hours and fifty eight minutes (due to more iterations of global routing), but reduced the time consumed in detailed routing from fifteen hours and nineteen minutes to ten hours and eight minutes.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for timing driven routing in a design of an integrated circuit (IC), the method comprising:
    performing, using a router application executing in a data processing system, a pre-global routing optimization of the design;
    setting a plurality of wirelength target constraints on a plurality of subsets of a set of nets in the design;
    performing global routing on the design;
    adjusting the design using wires placed in the design during the global routing;
    assigning a priority to each net in the set of nets; and
    performing detailed routing on the design.

2. The computer implemented method of claim 1, wherein the design is an design obtained after a placement operation, wherein the pre-global routing optimization produces a pre-global routing optimized design, wherein setting the plurality of wirelength target constraints uses the pre-global routing optimized design, wherein the global routing uses the pre-global routing optimized design and the plurality of wirelength target constraints to produce a global routed design, wherein the adjusting uses the global routed design to produce an adjusted global routed design, and wherein the detailed routing uses the adjusted global routed design and the priority associated with each net in the set of nets to produce a detailed routed design.

3. The computer implemented method of claim 1, wherein performing the pre-global routing optimization further comprises:
    performing a pin density spreading operation on the design;
    selecting a net from the set of nets whose timing characteristic has exceeded a threshold responsive to the pin density spreading operation; and
    adjusting the timing characteristic of the selected net in-place such that a cell to which the selected net belongs does not change position.

4. The computer implemented method of claim 3, wherein adjusting the timing characteristic of the selected net the in-place is accomplished using one of (i) threshold voltage tuning, and (ii) gate resizing, further comprising:
    performing a second global routing on the design including a change from the adjusting;
    determining, following the second global routing, whether the design has deteriorated responsive to the change; and
    undoing the change.

5. The computer implemented method of claim 1, wherein the setting the plurality of wirelength target constraints further comprises:
    categorizing into a plurality of categories, each net in the set of nets according to a timing criticality and a wirelength associated with each net; and
    associating with each category in the plurality of categories a wirelength target constraint.

6. The computer implemented method of claim 5, wherein setting the plurality of wirelength target constraints further comprises:
    assigning, to a net whose wirelength in the design is less than a threshold wirelength, a wirelength target constraint that is more stringent as compared to a second wirelength target constraint assigned to a second net whose wirelength in the design is more than the threshold wirelength; and assigning, to a third net whose slack is smaller than a slack threshold, a third wirelength target constraint that is more stringent as compared to a fourth wirelength target constraint assigned to a fourth net when the third net is more timing critical than the fourth net.

7. The computer implemented method of claim 1, wherein the adjusting the design using the wires placed in the design during global routing further comprises:
selecting, following the global routing, a net from the set of nets whose timing characteristic exceeds a threshold; and
performing, causing a change in the design, a timing optimization on the selected net using a subset of the wires placed in the design during the global routing.

8. The computer implemented method of claim 7, further comprising:
performing a second global routing;
determining, following the second global routing, whether the design has deteriorated responsive to the change; and
undoing the change.

9. The computer implemented method of claim 1, wherein assigning the priority further comprises:
categorizing into a plurality of categories, the nets in the set of nets according to a wirelength of each net;
adjusting a timing characteristic of each net in a category from the plurality of categories;
measuring a slew rate of each net in the category;
sorting the nets within the category according to each net's slew rate, forming a sorted order of nets; and
assigning a priority to each net in the category according to the net's position in the sorted order of nets.

10. The computer implemented method of claim 9, wherein a priority assigned to a net in the set of nets is used during a subsequent routing, and wherein a first net with a higher priority as compared to a priority of a second net is routed before the second net.

11. A computer usable program product comprising a computer usable storage medium including computer usable code for timing driven routing in a design of an integrated circuit (IC), the computer usable code comprising:
computer usable code for performing, using a router application executing in a data processing system, a pre-global routing optimization of the design;
computer usable code for setting a plurality of wirelength target constraints on a plurality of subsets of a set of nets in the design;
computer usable code for performing global routing on the design;
computer usable code for adjusting the design using wires placed in the design during the global routing;
computer usable code for assigning a priority to each net in the set of nets; and
computer usable code for performing detailed routing on the design.

12. The computer usable program product of claim 11, wherein the design is an design obtained after a placement operation, wherein the pre-global routing optimization produces a pre-global routing optimized design, wherein setting the plurality of wirelength target constraints uses the pre-global routing optimized design, wherein the global routing uses the pre-global routing optimized design and the plurality of wirelength target constraints to produce a global routed design, wherein the adjusting uses the global routed design to produce an adjusted global routed design, and wherein the detailed routing uses the adjusted global routed design and the priority associated with each net in the set of nets to produce a detailed routed design.

13. The computer usable program product of claim 11, wherein performing the pre-global routing optimization further comprises:
computer usable code for performing a pin density spreading operation on the design;
computer usable code for selecting a net from the set of nets whose timing characteristic has exceeded a threshold responsive to the pin density spreading operation; and
computer usable code for adjusting the timing characteristic of the selected net in-place such that a cell to which the selected net belongs does not change position.

14. The computer usable program product of claim 13, wherein adjusting the timing characteristic of the selected net the in-place is accomplished using one of (i) threshold voltage tuning, and (ii) gate resizing, further comprising:
computer usable code for performing a second global routing on the design including a change from the adjusting;
computer usable code for determining, following the second global routing, whether the design has deteriorated responsive to the change; and
computer usable code for undoing the change.

15. The computer usable program product of claim 11, wherein the setting the plurality of wirelength target constraints further comprises:
computer usable code for categorizing into a plurality of categories, each net in the set of nets according to a timing criticality and a wirelength associated with each net; and
computer usable code for associating with each category in the plurality of categories a wirelength target constraint.

16. The computer usable program product of claim 15, wherein setting the plurality of wirelength target constraints further comprises:
computer usable code for assigning, to a net whose wirelength in the design is less than a threshold wirelength, a wirelength target constraint that is more stringent as compared to a second wirelength target constraint assigned to a second net whose wirelength in the design is more than the threshold wirelength; and
computer usable code for assigning, to a third net whose slack is smaller than a slack threshold, a third wirelength target constraint that is more stringent as compared to a fourth wirelength target constraint assigned to a fourth net when the third net is more timing critical than the fourth net.

17. The computer usable program product of claim 11, wherein the adjusting the design using the wires placed in the design during global routing further comprises:
computer usable code for selecting, following the global routing, a net from the set of nets whose timing characteristic exceeds a threshold; and
computer usable code for performing, causing a change in the design, a timing optimization on the selected net using a subset of the wires placed in the design during the global routing.

18. The computer usable program product of claim 11, wherein the computer usable code is stored in a computer readable storage medium in a data processing system, and wherein the computer usable code is transferred over a network from a remote data processing system.

19. The computer usable program product of claim 11, wherein the computer usable code is stored in a computer readable storage medium in a server data processing system, and wherein the computer usable code is downloaded over a network to a remote data processing system for use in a computer readable storage medium associated with the remote data processing system.

20. A data processing system for timing driven routing in a design of an integrated circuit (IC), the data processing system comprising:

a storage device including a storage medium, wherein the storage device stores computer usable program code; and a processor, wherein the processor executes the computer usable program code, and wherein the computer usable program code comprises:

computer usable code for performing, using a router application executing in a data processing system, a pre-global routing optimization of the design;

computer usable code for setting a plurality of wirelength target constraints on a plurality of subsets of a set of nets in the design;

computer usable code for performing global routing on the design;

computer usable code for adjusting the design using wires placed in the design during the global routing;

computer usable code for assigning a priority to each net in the set of nets; and computer usable code for performing detailed routing on the design.

* * * * *